Feb. 11, 1930.  G. H. STEVENSON  1,746,803
BALANCED RADIO RECEIVING SYSTEM
Filed Sept. 26, 1925
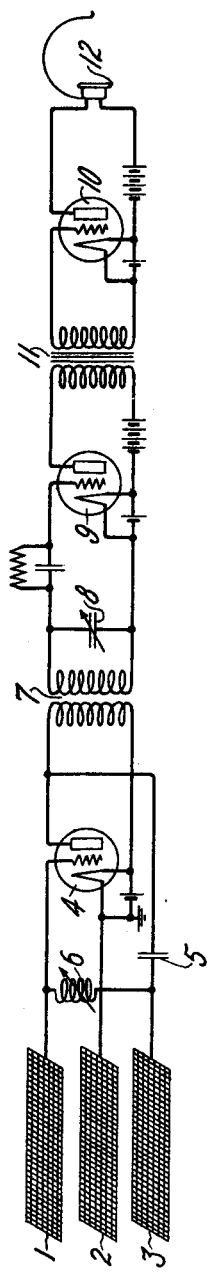
Inventor:
George H. Stevenson
by E.W. Adams, Atty.

Patented Feb. 11, 1930

1,746,803

UNITED STATES PATENT OFFICE

GEORGE H. STEVENSON, OF NEW YORK, N. Y., ASSIGNOR TO BELL TELEPHONE LABORATORIES, INCORPORATED, OF NEW YORK, N. Y., A CORPORATION OF NEW YORK

BALANCED RADIO RECEIVING SYSTEM

Application filed September 26, 1925. Serial No. 58,734.

This invention relates to communication systems and more particularly to radio receiving systems.

An object of this invention is to produce a balanced capacity antenna structure. Another object is to eliminate spurious oscillations in a radio receiving system employing a capacity antenna.

These objects and others, which will be apparent as the nature of the invention is disclosed, are accomplished by employing, in connection with radio receiving apparatus comprising a space discharge device, a divided aerial capacity for applying signal potential to the space discharge device. A balancing condenser is included between one plate of the aerial capacity and the space discharge device in order to compensate the feed back due to the internal capacity of the device.

Although the novel features which are believed to be characteristic of this invention will be pointed out with particularity in the claims appended hereto, the invention itself, its objects and advantages, the mode of its operation and the manner of its organization will be better understood by referring to the following description taken in connection with the accompanying drawing forming a part thereof in which the figure is a diagrammatical representation of a signaling system embodying this invention.

Referring to the figure more in detail, an aerial capacity represented by plates 1, 2 and 3 is employed as a receiving means to pick-up energy radiated from a distant transmitting station and to impress this energy upon suitable receiving apparatus. These plates are preferably disposed with their planes perpendicular to the electrostatic field of the received waves, whereby the potential differences between plates 1 and 2 and plates 3 and 2 are continuously in opposite phase. The potential electrostatically induced across plates 1 and 2 is impressed upon the grid and filament of space discharge amplifier 4. Aerial plate 3 is connected to the anode of the space discharge device 4 through condenser 5 which is adapted to balance the internal grid-plate capacity of the vacuum tube and to allow equal and opposite potentials to be impressed upon plate of tube 4 from condenser plates 1 and 3. Variable inductance 6 connected between electrodes 1 and 3 operates to establish the frequency to which the circuit including the aerial capacity will respond with minimum attenuation.

The output circuit of amplifier tube 4 is coupled to the input circuit of detector 9 by means of transformer 7, the secondary of which is tuned by variable condenser 8 to the frequency of the received wave. Current in the output circuit of detector 9 is transferred by means of low frequency transformer 11 to the input circuit of amplifier 10 which is herein shown as the single space discharge device although any number of stages of amplification may be employed to raise the amplitude of the resultant signal to the desired value. Signal currents in the output circuit of tube 10 are made available in signal responsive means 12.

The particular type of receiving circuit employed forms no part of this invention, consequently a simplified form has been chosen for purposes of illustration only; obviously any other suitable type of receiving circuit may be employed.

By the use of a divided aerial capacity as herein disclosed, the internal capacity of the radio frequency amplifier tube may be balanced by a small capacity connected between one electrode of the tube and one electrode of the aerial capacity so that feed-back and production of spurious oscillations in the amplifier tube is prevented.

The system of capacities including condenser 5, the grid to plate capacity of the space discharge tube, and the two aerial capacities constitute a balanced bridge circuit by which the branch including inductance 6 and the space discharge path are rendered conjugate. The electromotive force generated by the amplifier cannot therefore cause any current to flow in inductance 6 and consequently, such singing as may be possible in the system is not affected by this branch, which may be of any impedance from zero to infinity without altering the singing condition.

In the balanced systems heretofore proposed the two opposing electro-motive forces are obtained by means of a divided inductance and it is known that unless the coupling between the two parts of the inductance is perfect, there remains a tendency to sing even when the circuit is accurately balanced. This is due to the interaction of the leakage inductance of the divided coil with the inductance of the output circuit.

In the system of the present invention, the balancing of the bridge circuit effectively removes all inductance from the input circuit and hence removes all tendency to sing.

A capacity antenna is preferable to a loop antenna under certain conditions inasmuch as the effective height of a capacity antenna may be made considerably larger than that of a loop antenna without increasing the size to an impractical value. Hence, the advantages of the closed loop circuit are retained and used in connection with a capacity type antenna.

Although this invention has been shown and described as applied to a particular system, it should not be limited thereto but only in accordance with the scope of the invention as defined by the following claims.

What is claimed is:

1. In a radio receiving system including a space discharge device, a capacity antenna having three aerial plates, means for forming a balanced bridge circuit with the plates of said antenna to balance the internal capacity of said discharge device.

2. In a radio receiving system including space discharge devices, means for balancing the internal capacity of certain of said discharge devices comprising a capacity antenna having three aerial plates and a balancing condenser interconnecting one electrode of said space discharge devices and one of said aerial plates.

3. In a radio receiving system, a capacity antenna comprising three aerial plates, a three-electrode space discharge amplifier, means for impressing signal waves across two electrodes of said amplifier from two of said aerial plates, and balancing means interconnecting one electrode of said amplifier and one of said aerial plates.

4. In a radio receiving system, a capacity antenna comprising three aerial plates, a three-electrode space discharge amplifier, means for impressing a signal wave across two electrodes of said space discharge device from two of said aerial plates, and means for applying a different potential from said third aerial plate to the anode of said space discharge devices.

5. In a space discharge system, an aerial pickup means comprising three condenser plates, means connecting two of said plates with the input circuit of said space discharge system, and means including a balancing condenser connecting said third aerial plate with the output circuit of said space discharge system.

6. In a radio system a translating apparatus and means operating as an aerial pickup means to apply equal and opposite potentials to said translating apparatus, said means comprising three condenser plates arranged in the electrostatic field produced by a radiated wave.

7. In a radio receiving system, a radio frequency amplifier having an anode, a cathode and a grid element, a divided capacity antenna connected to said amplifier, and means for forming a balanced bridge circuit wherein the capacity antenna serves as two bridge arms and the inherent grid to plate capacity of the amplifier forms a third bridge arm.

8. In a radio receiving system, a divided capacity antenna, a space discharge amplifier connected to said antenna and having a grid, a cathode and an anode, and a balancing capacity connected between said plate and one element of said capacity antenna, said divided capacity antenna, the balancing capacity and the inherent grid to plate capacity of said device forming the arms of a balanced bridge circuit to prevent self-sustained oscillations.

9. In a radio receiving system, a space discharge amplifier having an anode, a cathode and a grid element, a divided capacity antenna connected to said amplifier, a balancing condenser and means comprising a balanced capacity Wheatstone bridge circuit for preventing sustained oscillations, the capacities of said antenna constituting two of the bridge arms, the balancing condenser constituting a third arm and the inherent grid to plate capacity of the amplifier constituting a fourth arm.

10. In a space discharge system, a capacity antenna divided into sections, a space discharge device connected to said antenna, and means comprising a balancing condenser connected between said device and the antenna for forming a balanced Wheatstone bridge circuit having four capacity arms.

11. In a radio receiving system, a space discharge amplifier having an anode, a cathode and a grid element, a divided capacity antenna having one section thereof connected to said grid element, a balancing condenser for connecting another section of said antenna to said anode and means comprising a capacity Wheatstone bridge circuit for preventing sustained oscillations, the capacities of said divided antenna constituting two arms of the bridge circuit and the balancing condenser constituting a third arm of the bridge circuit,.

12. In a radio receiving system, a radio frequency amplifier having an anode, a cathode and a grid element, a divided capacity antenna having one section thereof connected to said grid element, a balancing condenser for connecting another section of said antenna to said anode and means comprising a balanced Wheatstone bridge circuit for preventing sustained oscillations, the capacities of said antenna constituting two of the bridge arms, the balancing condenser comprising a third arm and the inherent grid to plate capacity of the amplifier constituting a fourth arm.

In witness whereof, I hereunto subscribe my name this 23 day of September A. D. 1925.

GEORGE H. STEVENSON.